United States Patent [19]
Ahmed et al.

[11] Patent Number: 5,579,993
[45] Date of Patent: Dec. 3, 1996

[54] HVAC DISTRIBUTION SYSTEM IDENTIFICATION

[75] Inventors: Osman Ahmed, Buffalo Grove, Ill.; John W. Mitchell; Sanford A. Klein, both of Madison, Wis.

[73] Assignee: Landis & Gyr Powers, Inc., Buffalo Grove, Ill.

[21] Appl. No.: 369,781

[22] Filed: Jan. 6, 1995

[51] Int. Cl.$^6$ .............................. F24F 7/00; G05B 13/02
[52] U.S. Cl. ...................... 236/49.3; 236/78 D; 364/165; 395/61
[58] Field of Search ............................... 236/49.3, 78 D; 165/22; 395/61, 21; 364/165

[56] References Cited

U.S. PATENT DOCUMENTS

| | | | |
|---|---|---|---|
| 4,696,167 | 9/1987 | Matsui et al. | 364/165 A |
| 4,795,088 | 1/1989 | Kobayashi et al. | 236/49.3 |
| 4,951,191 | 8/1990 | Hiroi et al. | 364/165 |

FOREIGN PATENT DOCUMENTS 5027806  2/1993  Japan ..................................... 364/165

OTHER PUBLICATIONS

Thomas Hartman, *Heating/Piping/Air Conditioning*, "TRAV—A New HVAC Concept", Jul. 1989, pp. 69–73.

Mashuri Warren et al., *ASHRAE Journal*, "Integrating VAV Zone Requirements with Supply Fan Operation", Apr. 1993, pp. 43–46.

T. Okada et al., *ASHRAE Transactions*, "Research and Development of a Home Use VAV Air–Conditioning System", 1992, vol. 2, Pt. 2, pp. 3610–3316.

Dave Goswami, *Heating/Piping/Air Conditioning*, "VAV Fan Static Pressure Control with DDC", Dec. 1986, pp. 113–117.

Donald Specht, *IEEE Transactions on Neural Networks*, "A General Regression Neural Network", Nov. 1991, Vol. 2, No. 6, pp. 568–576.

*Primary Examiner*—William E. Wayner
*Attorney, Agent, or Firm*—Greer, Burns & Crain, Ltd.

[57] ABSTRACT

A controller implemented in a heating, ventilation and air-conditioning (HVAC) distribution system provides improved control by implementing a general regression neural network to generate a control signal based on identified characteristics of components utilized within the HVAC system. The general regression neural network utilizes past characteristics and desired (calculated) characteristics to generate an output control signal. The general regression neural network is implemented in a feedforward process, which is combined with a feedback process to generate an improved control signal to control components within the HVAC distribution system. Implementation of the general regression neural network is simple and accurate, requires no input from an operator supervising the controller, and provides adaptive, real-time control of components within the HVAC distribution system.

8 Claims, 5 Drawing Sheets

5,579,993

HVAC DISTRIBUTION SYSTEM IDENTIFICATION

CROSS REFERENCE TO RELATED APPLICATIONS

1. TITLE: Global Control of HVAC Distribution System
INVENTOR: Osman Ahmed
    Ser. No. 08/369,425 filed Jan. 6, 1995 (pending Jul. 3,1996)
2. TITLE: Control of Prime Mover in HVAC Distribution System
INVENTOR: Osman Ahmed
    Ser. No. 08/369,342 filed Jan. 6, 1995, now U.S. Pat. No. 5,540,619

FIELD OF THE INVENTION

This invention is generally related to control systems, and more particularly to identification of characteristics of components implemented in HVAC distribution systems.

BACKGROUND OF THE INVENTION

Fluid distribution systems are well known in the art. One example of a fluid distribution system is the system associated with heating, ventilating and air-conditioning (HVAC) distribution systems. HVAC distribution systems see widespread use in commercial applications, i.e., residential housing, apartment buildings, office buildings, etc. However, HVAC distribution systems also see widespread use in laboratory-type settings. In this implementation, the HVAC system is primarily intended to exhaust potentially noxious fumes, etc.

In a majority of HVAC distribution system implementations, the primary goal is to produce and distribute thermal energy in order to provide the cooling and heating needs of a particular installation. For purposes of analysis, the distribution system can be divided into two sub systems; global and local sub systems. The global sub system consists of a primary mover (i.e., a source) which might be a fan in an air distribution system or a pump in a water distribution system. Also included in the global sub system is the duct-work required to connect the global sub system to the local sub system. The local sub system primarily consists of dampers or valves.

Current control practice, in both commercial and laboratory HVAC distribution systems, separates the global sub system from the local sub system and accordingly treats the individual sub systems independent of one another. The result of this separation is (1) poor controllability, (2) energy waste throughout the system, and (3) costly commissioning (installation and maintenance) processing.

FIG. 1 generally depicts a prior art HVAC distribution system. As depicted in FIG. 1, a fan controller 103 controls the variable air volume by controlling the speed of a fan 106 so that a constant static pressure at an arbitrary duct location (for example, the location 114) is maintained. A damper 118 is controlled by a damper controller 124. The static pressure at the location 114 fluctuates as the flow requirement of the damper 118 varies. However, the fan controller 103 ignores the requirement of static pressure in the entire system so that the flow requirement of the damper 118 can be satisfied. In this scenario, the fan controller 103 attempts to maintain an arbitrarily selected pressure setpoint, which is often set based on a maximum operating design condition. During normal operating conditions, however, the system static pressure requirement is considerably lower than the design condition. This results in a considerable amount of energy waste since the fan continuously operates to satisfy the maximum static pressure setpoint. If, on the other hand, the setpoint is much lower than the system requirement, the system is incapable of satisfying the flow requirements, which results in an ineffective system. In addition, no scientific methods exist to determine the best (optimum) position of the static pressure sensor 112 within the duct 115. In other words, the positioning of the static pressure sensor 112 is more of an art than a science. Furthermore, the tuning of the VAV fan control can be time consuming and costly if the selected pressure setpoint and the position of the static pressure sensor 112 are chosen incorrectly.

In a high pressure system (when measured by the static pressure sensor 112), dampers or valves within the local sub system must be in an almost closed position to maintain their individual set points. This, however, leads to the generation of undue noise and pressure loss in the system. In addition, dampers or valves in the almost closed position exhibit highly non linear characteristics, making tuning and controllability of these elements a challenge.

In a control strategy which overcomes the inherent problems discussed above, identification of certain characteristics of the components (inter alia, dampers or fans) must be performed. Quick and accurate identification of these characteristics are crucial to the successful implementation of the control strategy. However, prior art techniques of identification of these characteristics have disadvantages themselves.

For example, statistical analysis has been used in HVAC distribution systems in an attempt to perform identification of characteristics of the components utilized within the HVAC system. The goal of the statistical analysis is to fit the past data with a "best-fit" equation in an attempt to predict a future control signal based on past history. In this scenario, an operator must input a priori knowledge of the equation type, or the code implemented in the statistical analysis must search for the "best-fit" equation exhaustively. The operator requirement is cumbersome and does not lend itself to real-time adaptive control of the components implemented in the HVAC distribution system. The code requirement is intensive and is likewise not well-suited for real-time adaptive control of components due to the time required to perform the exhaustive search for the "best-fit" equation constants.

Thus, a need exists for a method of component characteristic identification which does not require any user input and uses a simple code so that adaptive, real-time control of components implemented in a HVAC distribution system may be accomplished.

SUMMARY OF THE INVENTION

It is therefore an object of the present invention to provide an improved method and apparatus for component characteristic identification in a HVAC distribution system.

Another object is to provide an improved method and apparatus for identifying characteristics of local and source components implemented in a HVAC distribution system.

A related object is to provide such an improved method and apparatus for identifying characteristics of local and source components that may be implemented adaptively and in real-time without operator input.

Another object is to provide an improved method and apparatus that is easily implemented with simple code which does not require exhaustive searching for a "best-fit" equation as required by prior art techniques.

Yet another object is to provide an improved method and apparatus for generating a control signal for controlling a component in a HVAC distribution system.

These and other objects will become apparent upon reading the following detailed description of the preferred embodiment of the present invention, while referring to the attached drawings. dr

DETAILED DESCRIPTION OF A PREFERRED EMBODIMENT

Generally stated, the method and apparatus identifies past characteristics of the component of the HVAC distribution system, calculating desired characteristics of the component of the HVAC distribution system, and generates, based on the past and desired characteristics of the component, a control signal to control the component of the HVAC distribution system by utilizing a general regression neural network. The past characteristics are stored in a look-up table, and certain past characteristics are identified based on values of measured system variables. The components that may be beneficially controlled by the controller in accordance with the invention include a fan, a pump, a damper, a fume hood, a supply box, a general exhaust box, or any other component in a HVAC distribution system that requires adaptive, real-time control.

In the preferred embodiment, the components of the HVAC fluid distribution system are a fan and a damper. The identified characteristics of the fan are a pressure setpoint ($P_{fsp}$) and a flow setpoint ($Q_{fsp}$) of air at the output of the fan, and a fan control signal ($Y'_f$). The identified characteristics of the damper are an authority ($\hat{A}$) and a percentage of flow (% FullFlow) of the damper, and a damper control signal ($Y'_d$). In an alternate embodiment, the authority ($\hat{A}$) may be replaced by a static pressure at the inlet of the damper ($P_{i1}$) for small distribution systems since the damper authority $\hat{A}$ may not vary a significantly.

Also in the preferred embodiment, the controller includes a feedforward means for generating a feedforward control signal based on the identified characteristics of the component and calculated system variables and a feedback means for generating a feedback control signal based on measured system variables. The controller then controls the component based on a combination of the feedforward control signal and the feedback signal.

Figure 2:
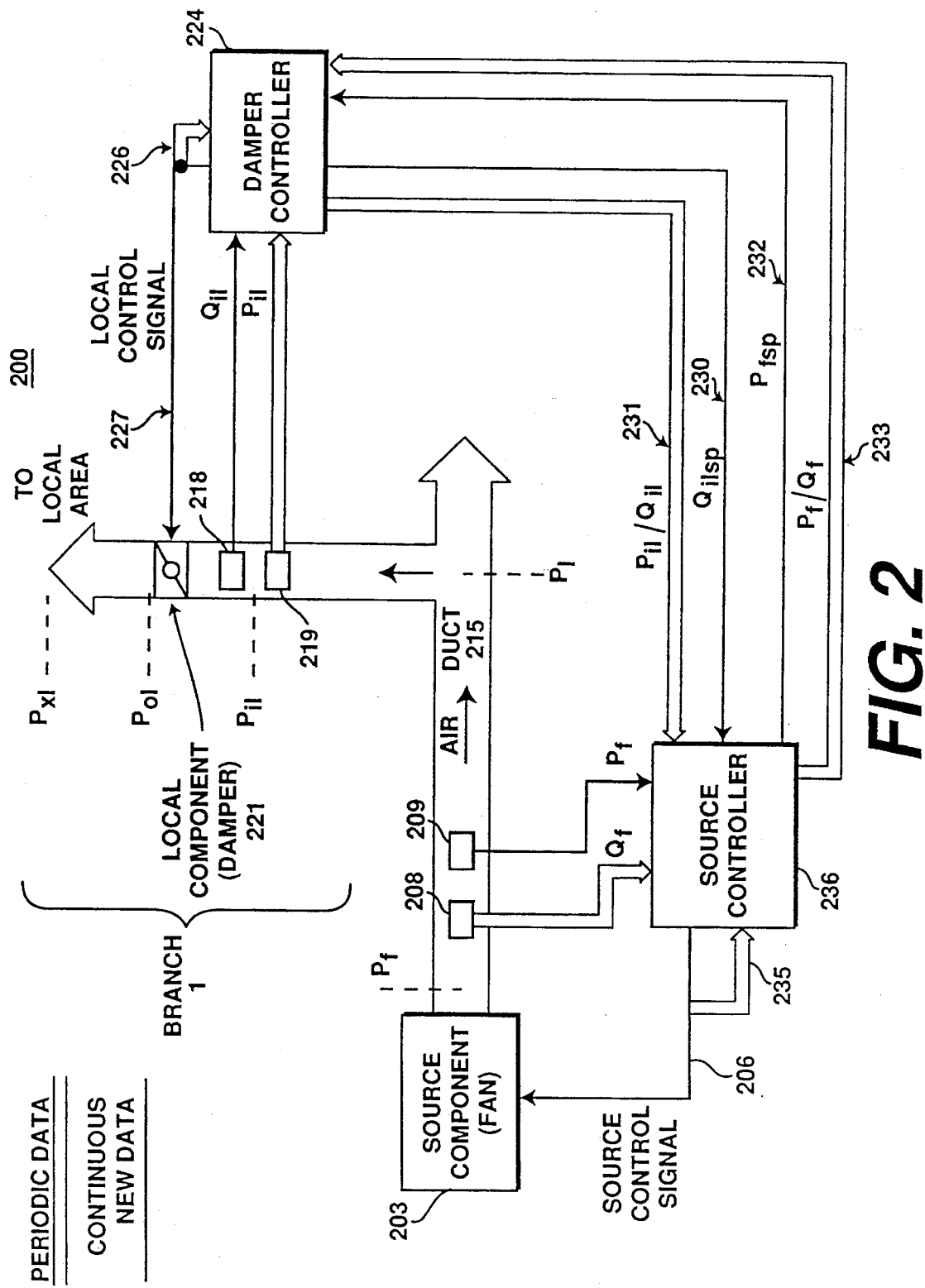
FIG. 2 depicts, in block diagram form, a HVAC system under control in accordance with the invention.

A control system is implemented in a fluid distribution system in accordance with the present invention as shown in FIG. 2. As stated above, the preferred embodiment fluid distribution system is a HVAC system. However, as one of ordinary skill in the art will appreciate, the control system described hereinafter may be beneficially employed in any fluid distribution system with qualities similar to HVAC systems. The block diagram of FIG. 2 depicts a HVAC system primarily intended for use in commercial settings, but may be easily modified to perform in laboratory settings. All fluid flow is measured in units of cubic feet per minute (cfm), while all pressures are measured in units of inches of water gauge (w.g.).

The embodiment of FIG. 2 relates to an air distribution system in a commercial setting, but as one of ordinary skill in the art will appreciate, the apparatus may be beneficially implemented in laboratory buildings as well. In commercial buildings, the goal is to provide thermal comfort while lowering energy cost, while in laboratory buildings a third goal of safety is added. Continuing, the source component 203 is implemented as a fan 203, while the local component 221 is implemented as a damper 221. As one of ordinary skill in the art will again appreciate, the source component 203 may be implemented as any prime mover (pump, etc.) depending on the system of choice, while the local component 221 may be implemented as any controllable variable air flow device (fume hood, supply boxes, general exhaust boxes, etc.).

In the embodiment depicted in FIG. 2, a static pressure sensor 209 is not arbitrarily located, but instead is located at the output of the fan 203. This is done so that the fan static pressure $P_f$ will be utilized in the same manner by the source controller 236, no matter what the configuration of the system. In other words, the fan static pressure $P_f$ can be correlated to a particular system independent of the configuration of the system.

As also depicted in the embodiment of FIG. 2, the setpoint of the static pressure sensor 209 is allowed to vary to accommodate varying pressure in the main duct 215 due to the opening/closing of the damper 221. Allowing the setpoint of the static pressure sensor 209 (and consequently static pressure $P_f$ and flow $Q_f$ at the output of the fan 203 ) to vary is significant since the energy (in horsepower) of the fan 203 is proportional to the product of the static pressure $P_f$ and the flow Q. Thus, for example, a 50% savings in static pressure $P_f$ translates to a 50% energy savings in operation of the fan 203. Because of the new relationship between the static pressure $P_f$ and the flow $Q_f$ at the output of the fan 203 and the static pressure $P_{i1}$ and the flow $Q_{i1}$ related to the damper 221, a data exchange between the local controller 224 and the source controller 236 is necessary.

Data exchange between the source controller 236 and the local controller 224 occurs via the lines 230–233 as depicted in FIG. 2. The line 230 transfers a damper flow setpoint $Q_{i1sp}$ from the local controller 224 to the source controller 236, while the line 231 transfers the static pressure $P_{i1}$ and the flow $Q_{i1}$ measured at the inlet of the damper 221. The transferred static pressure $P_{i1}$ and the flow $Q_{i1}$ are measured by the static pressure sensor 219 and the flow sensor 218 respectively, each being located at the inlet of the damper 221. The line 231 exchanges data periodically for updating the identification of the system flow versus pressure loss relationship.

As one of ordinary skill in the art will appreciate, many well known techniques exist to measure the static pressures $P_f$ and $P_{i1}$ and the flows $Q_f$ and $Q_{i1}$ at the locations depicted in FIG. 2. One technique is to utilize solenoids configured to aid in the measurement. Important to note is that it may be feasible to calculate the pressure loss across the damper 221 by having only the inlet static pressure $P_{i1}$. In that case, only a single solenoid would be required. The use of solenoids to measure static pressure may be implemented in commercial buildings because of the differential pressure range compatibility with a known flow sensor. For laboratory applications, however, an additional static pressure sensor would be required instead of a solenoid due to the small range of differential pressure required to be measured. The static pressure sensor will be sufficient for laboratory applications since the static pressure measurement is utilized for characterizing the damper 221, and not for control of the damper 221.

Input from only a single local controller 224 is depicted in FIG. 2 for simplicity. In a practical implementation, the source controller 236 would receive inputs from a plurality of networked local controllers (not shown), each of the plurality of local controllers controlling their own local component. The networked local controllers would then be coupled to the source controller 236. Consequently, when the source controller 236 receives inputs from all of the local controllers in a particular implementation, the source controller 236 determines an air flow setpoint $Q_{fsp}$ requirement and then determines a fan pressure setpoint $P_{fsp}$ requirement from the system flow versus pressure loss relationship.

Also depicted in FIG. 2 is a data exchange from the source controller 236 to the local controller 224 via the lines 232 and 233. The line 232 transfers the pressure setpoint $P_{fsp}$ requirement of the fan 203 as determined by the source controller 236, while the line 233 transfers the measured static pressure $P_f$ and the flow $Q_f$ at the output of the fan 203. The line 233 exchanges data periodically for updating the identification of the damper 221. Based on the pressure setpoint $P_{fsp}$ requirement, the local controller 224 calculates the static pressure $P_{i1}$. Once the static pressure $P_{i1}$ is and the flow setpoint $Q_{i1sp}$ of the damper 221 are known, the local controller 224 generates the required control signal 227. Under control from the control signal 227, the damper 221 will either open or close depending on the required control.

Figure 3:
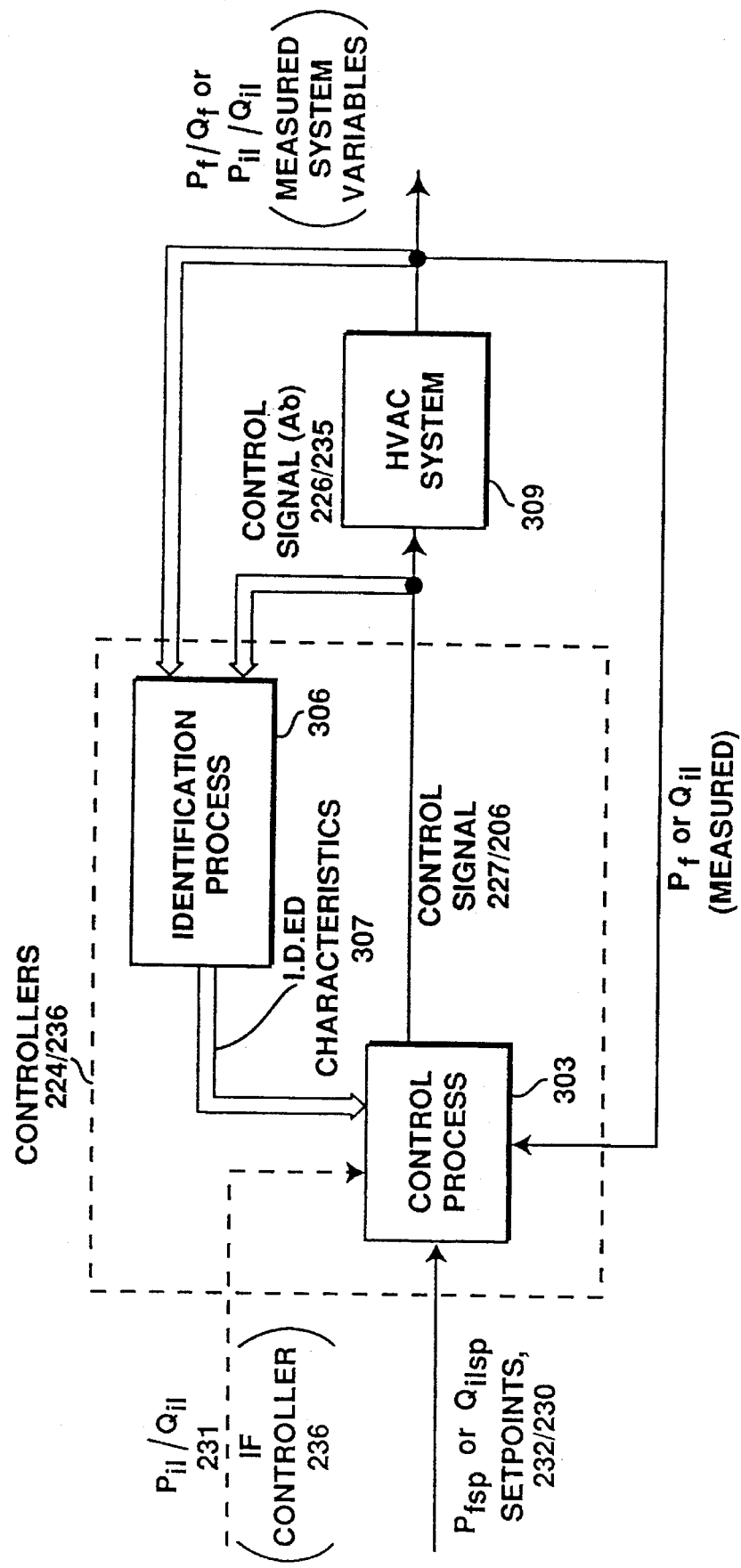
FIG. 3 generally depicts the global control strategy implemented in the local controller and source controller of FIG. 2 in accordance with the invention.

A global control strategy implemented in the local controller 224 and the source controller 236 of FIG. 2 is shown in FIG. 3 in accordance with the invention. As depicted in FIG. 3, the controllers 224 and 236 are divided into separate processes, an identification process 306 and a control process 303. Separation of the identification process 306 from the control process 303 allows the identification process 306 to be implemented periodically, adaptively, in real-time, while allowing the control process 303 to be implemented continuously. Separating the two processes results in the advantage that the performance of the control process 303 is not sacrificed by allowing the identification process 306 to operate adaptively, in real-time.

The identification process 306 identifies certain characteristics of either the damper 221 or the fan 203. These identified characteristics are output to the control process 303 via a line 307. The control process 303 accepts the identified characteristics, along with other signals shown in FIG. 3, and outputs a control signal (via the line 227 to the damper 221 or via the line 206 to the fan 203) so as to provide global control of the HVAC system 309 in accordance with the invention.

In the preferred embodiment, the identification process 306 utilizes a look-up table (not shown) to store characteristics of either the damper 221 or the fan 203. For the damper 221, these characteristics are the ratio of the pressure drop across the damper 221 to the branch pressure drop when the damper 221 is fully open (authority, $\hat{A}$), the percentage of flow through the damper 221 normalized to the maximum flow through the damper 221 (% FullFlow), and the damper control signal ($Y'_d$). The authority $\hat{A}$ can be replaced by inlet static pressure $P_{i1}$ in small systems as explained above. For the fan 203, these characteristics are the pressure setpoint ($P_{fsp}$), the summation of the flow setpoints from each local controller ($Q_{fsp}$), and the fan control signal ($Y'_f$). These identified characteristics are output from the identification process 306 as identified characteristics via line 307. Choice of which stored characteristics to identify and output via line 307 is dependent on the values of the measured system variables and the control signal input into the identification process 306.

Figure 1:
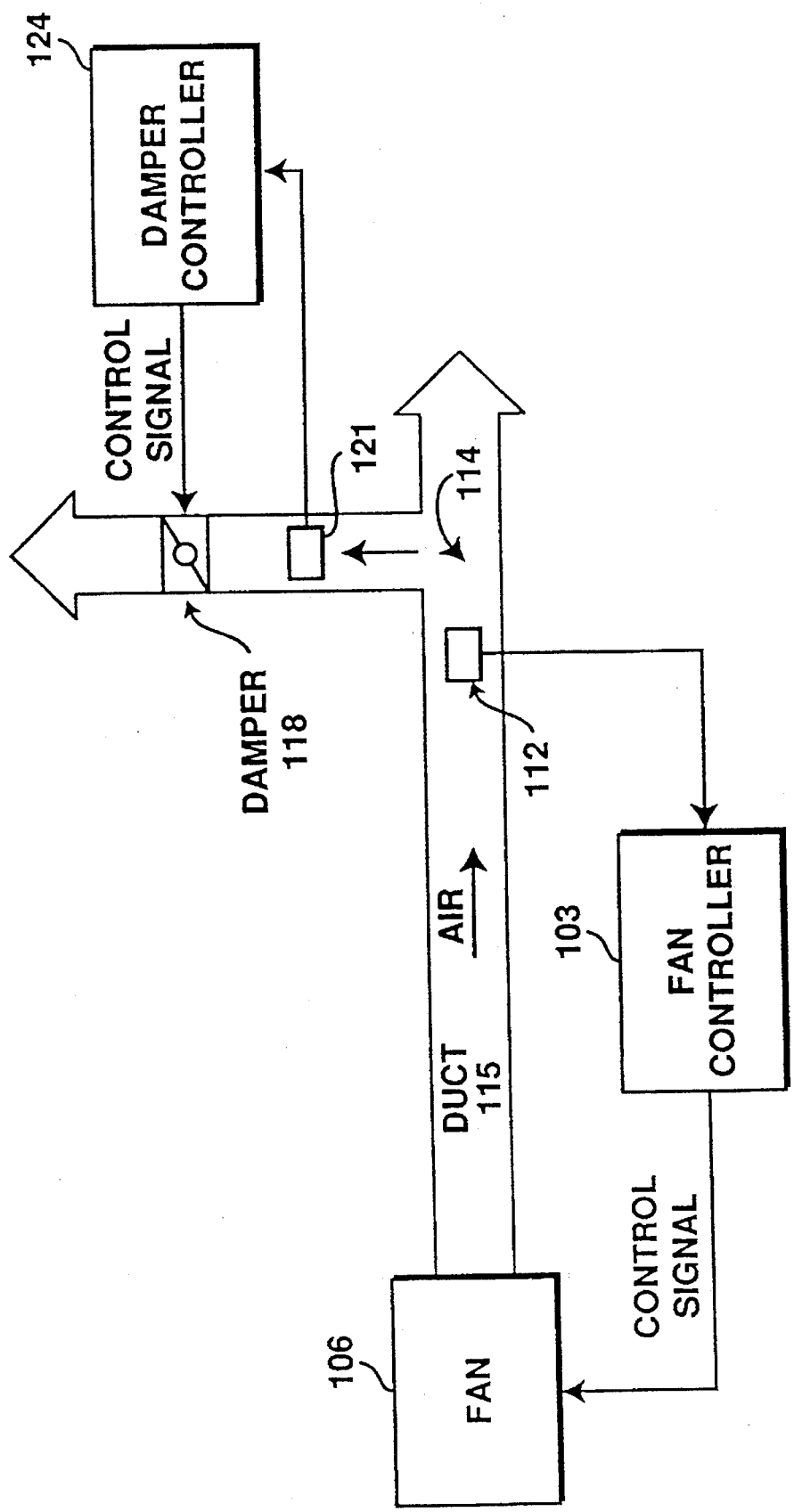
FIG. 1 generally depicts, in block diagram form, a prior art control system implemented in a HVAC system.
Figure 4:
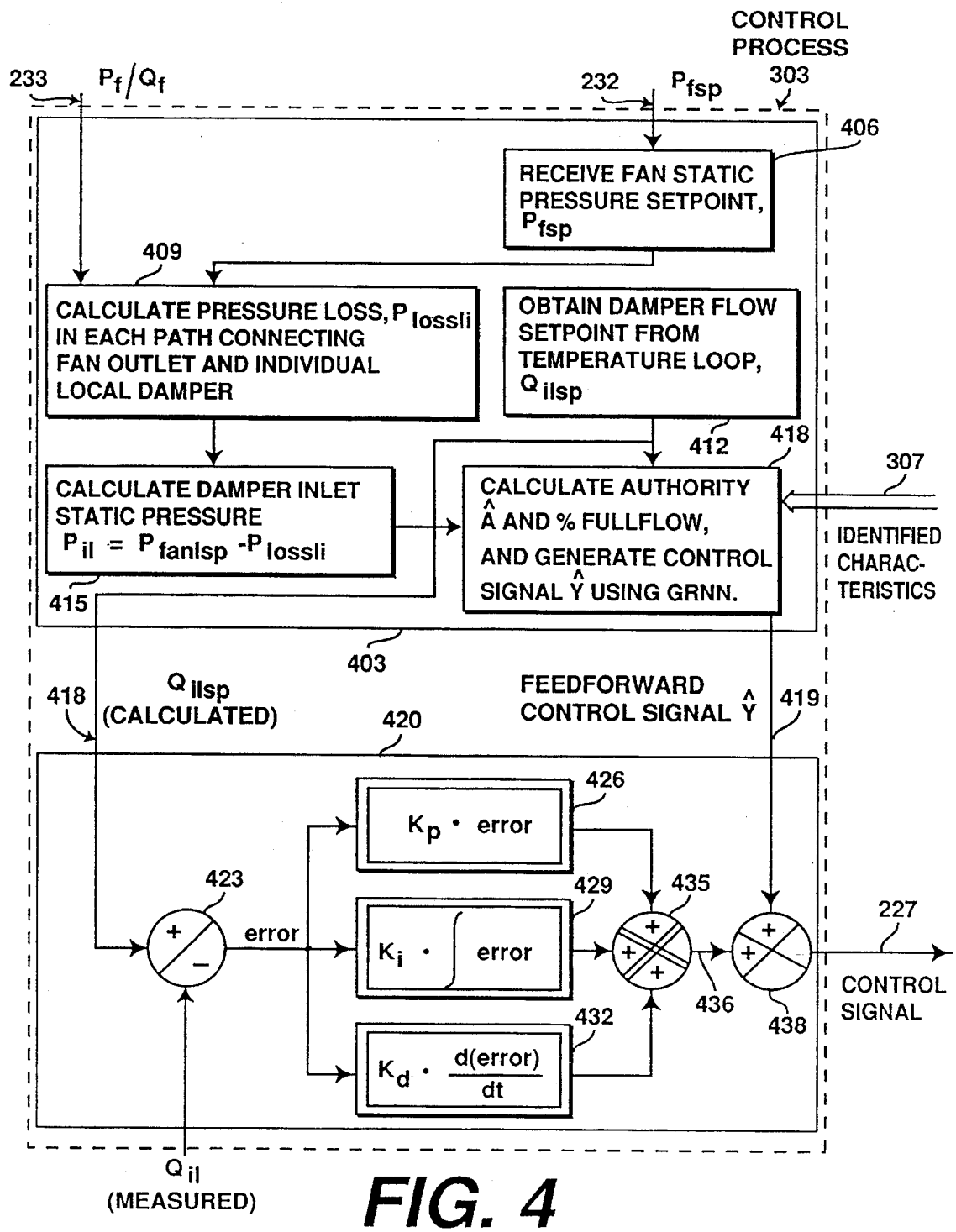
FIG. 4 generally depicts, in block diagram form, the control process of FIG. 3 implemented in a local controller for controlling a local component in accordance with the invention.

The control process 303 implemented in the local controller 224 for controlling a local component 221 in accordance with the invention is depicted in FIG. 4. As depicted in FIG. 4, the process implemented within the control process 303 is divided into a feedforward process 403 and a feedback process 420. In prior art controllers for HVAC systems (for example the controller 124 of FIG. 1), only the feedback process 420 was implemented. In those systems, the feedback process 420 would operate as a proportional-integral-derivative (PID) control loop, which is a well known technique in the art. As such, only measured values (for the example of the local controller 224) of $Q_{i1}$ were utilized. However, due to the noise inherent in the measured system variable $Q_{i1}$, the accuracy of the generated control signal suffered.

As depicted in FIG. 4, the feedback process 420 accepts as input a calculated $Q_{i1sp}$ and also a feedforward control signal ($\hat{Y}$) via a line 419. These signals are utilized by the feedback process 420 to generate a control signal 227 with a higher degree of accuracy. The outputs of the feedforward process 403 are calculated signals, which are thus not dependent on any measured values. If the calculated $Q_{i1sp}$ is ideal, it should be equivalent to the measured $Q_{i1}$, thus resulting in zero error exiting the node 423. If zero error enters the blocks 426, 429 and 432, the last utilized control signal will again be output as the feedback control signal 436. If the feedforward control signal $\hat{Y}$ on the line 419 is calculated to be the same as the feedback control signal on the line 436, the control signal on the line 227 exiting the node 438 will be the same as in the prior iteration. If the calculated signals provide the majority of control when compared to the measured signals, the effects of noise on the generation of control signal 227 is greatly reduced. In this manner, the feedforward process 403 operates in conjunction with the feedback process 420 to produce a more accurate control signal on the line 227 in accordance with the invention.

When implemented in the local controller 224, the feedforward process 403 starts by first receiving the fan static pressure setpoint $P_{fsp}$ on the line 232. This is performed at the block 406 of FIG. 4. The fan static pressure setpoint $P_{fsp}$ is routed to the block 409 where the pressure loss, $P_{lossi}$, is calculated for each of the i branches connecting the fan outlet and the individual local damper. In the preferred embodiment, the pressure loss $P_{lossi}$ for each of the i branches is determined adaptively, in real-time. To calculate the pressure loss for branch 1, i.e., $P_{loss1}$, the following steps should be followed.

Calculation of the pressure loss $P_{loss1}$ for branch 1 begins by calculating the pressure loss for a first segment of the branch 1, which is from the outlet of the fan 203 to the inlet of the damper 221. The general equation to calculate the pressure loss $P_{loss}$ is given by:

$$P_{loss} = K \ast Q^2 \quad (1)$$

where $P_{loss}$=pressure loss, K=friction coefficient, and Q=flow rate. In this example, only the branch 1 pressure loss $P_{loss}$ is calculated for simplicity. Referring to FIG. 2, the air flow from the fan 203 through the branch 1 can be segmented into smaller paths. The pressures $P_f$, $P_1$, $P_{i1}$, $P_{o1}$ and $P_{x1}$ as shown in FIG. 2 have locations as follows:

$P_f$=static pressure @ output of the fan 203, $P_1$=static pressure @ input to branch 1, $P_{i1}$=static pressure @ inlet to the damper 221 within branch 1, $P_{o1}$=static pressure @ output of the damper 221 within branch 1, and $P_{x1}$=static pressure @ input to the local area serviced by branch 1.

The pressure loss $P_{loss1}$ for branch 1 from the fan 203 through the branch 1 is given by the expression $P_f-P_{x1}$, and can be written as, $$P_f - P_{x1} = (P_f - P_{i1}) + (P_{i1} - P_{o1}) + (P_{o1} - P_{x1}) \quad (2)$$

where $$P_f - P_{i1} = (K_{f1} \ast Q_f^2) + (K_{1i1} \ast Q_{i1}^2) \quad (3)$$

Equation (3) represents the pressure loss from the outlet of the fan 203 to the inlet of the damper 221. Once the constants $K_{f1}$, $K_{1i1}$ of equation (3) are determined, it is possible to calculate the pressure loss from the outlet of the fan 203 to the inlet of the damper 221 in branch 1.

Two subsegments of the first segment need to be considered to determine the friction coefficients $K_{f1}$ and $K_{1x1}$ of equation (3); $P_f$-to-$P_1$ and $P_1$-to-$P_{i1}$. Assuming that $P_f$, $P_{i1}$, $Q_f$, and $Q_{i1}$ will be measured, $K_{f1}$ and $K_{1x1}$ are the only unknown quantities. By measuring n sets of values of $P_f$, $P_{i1}$, $Q_f$, and $Q_{i1}$, and substituting these sets of values into equation (3) n times, the resulting equations can be solved for the unknown friction coefficients $K_{f1}$ and $K_{1x1}$ by simple regression. As the system goes into operation, more sets of $P_f$, $P_{i1}$, $Q_{i1}$, and $Q_{i1}$ can be collected and used to constantly update and refine the values of $K_{f1}$ and $K_{1x1}$. This step is repeated for each additional branch, recognizing that $K_{f1}$ is known from the prior determination.

The next step is to calculate the pressure loss of a second segment, which is from the inlet to the damper 221 to the inlet of the local area serviced by the branch 1. The pressure loss of the second segment can be determined using the expression:

$$P_{i1} - P_{x1} = (Co \ast Q_{i1}^2) + (K_{o1x1} \ast Q_{i1}^2) \quad (4)$$

The first term of the equation (4) (having Co as a friction coefficient) is the pressure loss across the damper 221, while the second term of the equation (4) (having $K_{o1x1}$ as a friction coefficient) is the pressure loss from the output of the damper 221 to the inlet of the local area serviced by the branch 1. The friction coefficient Co has the general nature:

$$Co = m_1 e^{-(m_2 \ast \% \text{ open})} \quad (5)$$

where $m_1$, $m_2$ and $K_{o1x1}$ are constants to be determined. The % open is feedback signal from the damper 221 which indicates the position of the damper 221 by indicating the percentage the damper 221 is open when compared to the damper 221 being fully open (dfo). Substituting the equation (5) into the equation (4) yields:

$$P_{i1} - P_{x1} = (m_1 e^{-(m_2 \ast \% \text{ open})} \ast Q_{i1}^2) + (K_{o1x1} \ast Q_{i1}^2) \quad (6)$$

When the % open is available, the damper position is adjusted n times (yielding correspondingly different values for % open) and $P_{i1}$ and $Q_{i1}$ are measured n times. The pressure $P_{x1}$ is estimated to be 0.05 inches per water gauge (w.g.). With the measured data and the corresponding % open values, the constants $m_1$, $m_2$ and $K_{o1x1}$ can be determined through simple regression. The equation (6) can then be utilized to calculate the pressure loss for the second segment. This pressure loss is added to the pressure loss for the first segment to yield the pressure loss $P_{loss1}$ for the branch 1.

The equation (6) can also be used if the % open is not available. In this calculation, values of $m_1$ and $m_2$ obtained from tables available from ASHRAE are inserted into the equation (6). The damper is fully opened (i.e., % open=100), and $P_{i1}$ and $Q_{i1}$ are measured n times. With the damper fully open, the speed of the fan 203 is modulated (n times) and again $P_{i1}$, and $Q_{i1}$, are measured. The values of $m_1$, $m_2$, $P_{i1}$ and $Q_{i1}$ are inserted into the equation (6), which is then solved iteratively to determine the value for the constant $K_{o1x1}$. At this point, the equation (6) can again be utilized to calculate the pressure loss for the second segment. This pressure loss is added to the pressure loss for the first segment to yield the pressure loss $P_{loss1}$ for the branch 1.

Important to note is that the above described method of calculating pressure loss $P_{lossi}$ applies for i additional branches connected to the main duct 215. In that situation, the number of duct segments will increase as the distance between the fan 203 and the branch take-off from the main duct 215 increases. The above procedure can be progressively used to calculate the "K" values of each segment of the duct in finding the friction coefficients of flow sensors for each damper utilized in the system. After the pressure loss $P_{loss1}$ for the branch 1 has been calculated, the feedforward process 403 utilizes the calculated $P_{loss1}$ to calculate the inlet static pressure $P_{i1}$ at the inlet of the damper 221. This is done in the block 415 by subtracting the calculated pressure loss $P_{loss}$ from the static pressure set point $P_{fsp}$ received as an input to the block 406. In parallel to the blocks 409 and 415, the feedforward process 403 obtains, in the block 412, the flow setpoint $Q_{i1sp}$ of the damper 221 from a temperature control loop in the controller (not shown). The flow setpoint $Q_{i1sp}$ exiting the block 412 is input into the feedback process 420, and represents the calculated flow setpoint $Q_{i1sp}$. The flow setpoint $Q_{i1sp}$ exiting the block 412 is also input into the block 418, together with the calculated inlet static pressure $P_{i1}$ calculated in the block 415. The block 418 also has as input identified characteristics input on the line 307. The identified characteristics are determined by the identification process 306 of FIG. 3. In the embodiment depicted in FIG. 4, the identified characteristics input on the line 307 are related to the damper 221.

The block 418 uses the flow setpoint $Q_{i1sp}$ and the calculated inlet static pressure $P_{i1}$, together with the identified characteristics (stored values of authority Â, % Full-Flow, and $Y'_d$), to generate the feedforward control signal Ŷ to be output on the line 419. To effectively calculate the feedforward control signal Ŷ, a General Regression Neural Network (GRNN) is implemented in the preferred embodiment of the present invention. For a discussion of GRNN, reference is made to A General Regression Neural Network, Donald F. Specht, *IEEE Transactions on Neural Networks*, vol. 2, no. 6, November 1991, which is specifically incorporated herein by reference.

A GRNN is chosen to generate the feedforward control signal $\hat{Y}$ 419 for given values of $\hat{A}$ and % FullFlow due to its simplicity, robustness and excellent capability in system identification. Unlike conventional neural networks, a GRNN requires little or no training for small data sets while effectively capturing system properties from past history. A GRNN is a one-pass learning algorithm having a highly parallel structure which performs forward path estimates by estimating probability density functions. Even with sparse data in a multi-dimensional measurement space, the algorithm provides smooth transitions from one observed value to another.

The algorithmic form can be used for any regression problem in which an assumption of linearity is not justified. If the joint probability density function of X and Y (as an-example) are known, then the conditional probability density function and the expected value can be computed. In this case, the joint probability density functions will be estimated from examples using non-parametric estimates. The resulting regression equation can be implemented in a parallel, neural-network-like structure. The structure of data is determined directly from past data, the structure is trained and generalized without feedback. The network also estimates values of X and Y for any new value of X in the short time determined by the propagation time through four layers of the neural network. The GRNN is preferably implemented in an integrated circuit (not shown), thus eliminating the software development process to a large extent. This implementation also eliminates software coding during field installation. In the preferred embodiment, the GRNN is implemented in the block 418. The basic equation for a GRNN is $$E[y|X] = \frac{\int_{-\infty}^{+\infty} y f(X,y) dy}{\int_{-\infty}^{+\infty} f(X,y) dy} \qquad (7)$$

where

E[y\X]=the conditional mean of y on X, f(x,y)=the known joint continuous probability density function y=a scalar random variable, x=a vector random variable, X=a particular measured value of the random variable x. The probability estimate is based on the parzen estimator as described by Specht, supra. A physical interpretation of the probability estimate is that it assigns sample probability of width o for each sample. The probability estimate $\hat{f}$ is the sum of those sample probabilities. Substituting the joint probability estimate $\hat{f}$ into the conditional mean gives the desired conditional mean of y given on X ($\hat{Y}(X)$):

$$\hat{Y}(X) = \frac{\sum_{i=1}^{n} Y' \exp\left(-\frac{D_i^2}{2\sigma^2}\right)}{\sum_{i=1}^{n} \exp\left(-\frac{D_i^2}{2\sigma^2}\right)}$$

where $\hat{Y}(X)$=the feedforward control signal $\hat{Y}$ as a function of X, $D_i^2 = (X-X_i)^T(X-X_i)$, X=desired (forward) values of $\hat{A}$ and % FullFlow, $X_i$=stored (past) values of $\hat{A}$ and % FullFlow, Y'=stored (past) value $Y'_d$ of the control signal $\hat{Y}$, and σ=width for the same probability.

In the block 418, the desired value of the authority $\hat{A}$ is first determined. The authority $\hat{A}$ can generally be expressed as:

$$\hat{A} = \frac{(P_{i1} - P_{o1})|_{dfo}}{(P_f P_{x1})|_{dfo}} \qquad (9)$$

where dfo signifies that the damper 221 is fully open. From equation (4), the pressure loss across the damper 221 is given by the first term (having Co as a friction coefficient). Consequently, the pressure loss across the damper 221 when the damper 221 is fully open $(P_{i1}-P_{o1})|_{dfo}$ can be calculated using the expression:

$$(P_{i1}-P_{o1})|_{dfo} = Co_{\%\ open=100} * Q_{dmax}^2 \qquad (10)$$

where $Q_{dmax}^2$ is the maximum permissible flow through the damper 221. $Q_{dmax}$ can be determined by measuring $P_{i1}$ at full flow, and using the equation (6) for % open=100 and the determined values of $m_1$, $m_2$ and $K_{o1x1}$. The constant $Co_{\%\ open=100}$ can be determined as described above when the % open value is available, or will be known in the case where the % open value is not available by sending the maximum control signal to the damper 221 and insuring that the maximum flow is achieved.

The path pressure loss when the damper 221 is fully open $(P_f-P_{x1})|_{dfo}$ can be calculated once the damper pressure loss at full flow is known and using the flow v. pressure loss relationship generally described in equations (1) and (3):

$$(P_f-P_{x1})|_{dfo} = (K_{f1}*Q_f^2) + (K_{1i1}*Q_{dmax}^2) + (P_{i1}-P_{o1})|_{dfo} + (K_{x1}*Q_{dmax}^2)$$

(11)

At this point, equations (10) and (11) can be used to solve for the authority $\hat{A}$.

The desired value for the % FullFlow can also be calculated using the expression:

$$\%\ \text{FullFlow} = \frac{Q_{i1sp}}{Q_{dmax}} * 100 \qquad (12)$$

The maximum flow $Q_{dmax}$ is known from above. The flow setpoint $Q_{i1sp}$ is provided to the block 418 from the block 412. Having determined the desired values for the authority $\hat{A}$ and the % FullFlow, the GRNN can be used to predict the feedforward control signal $\hat{Y}(X)$. The stored values of the authority $\hat{A}$, % FullFlow, and $Y'_d$ are received by the block 418 as identified characteristics via the line 307. All values can be inserted into equation (8) to generate the feedforward control signal $\hat{Y}(X)$, which is output from the block 418 via the line 419.

Figure 5:
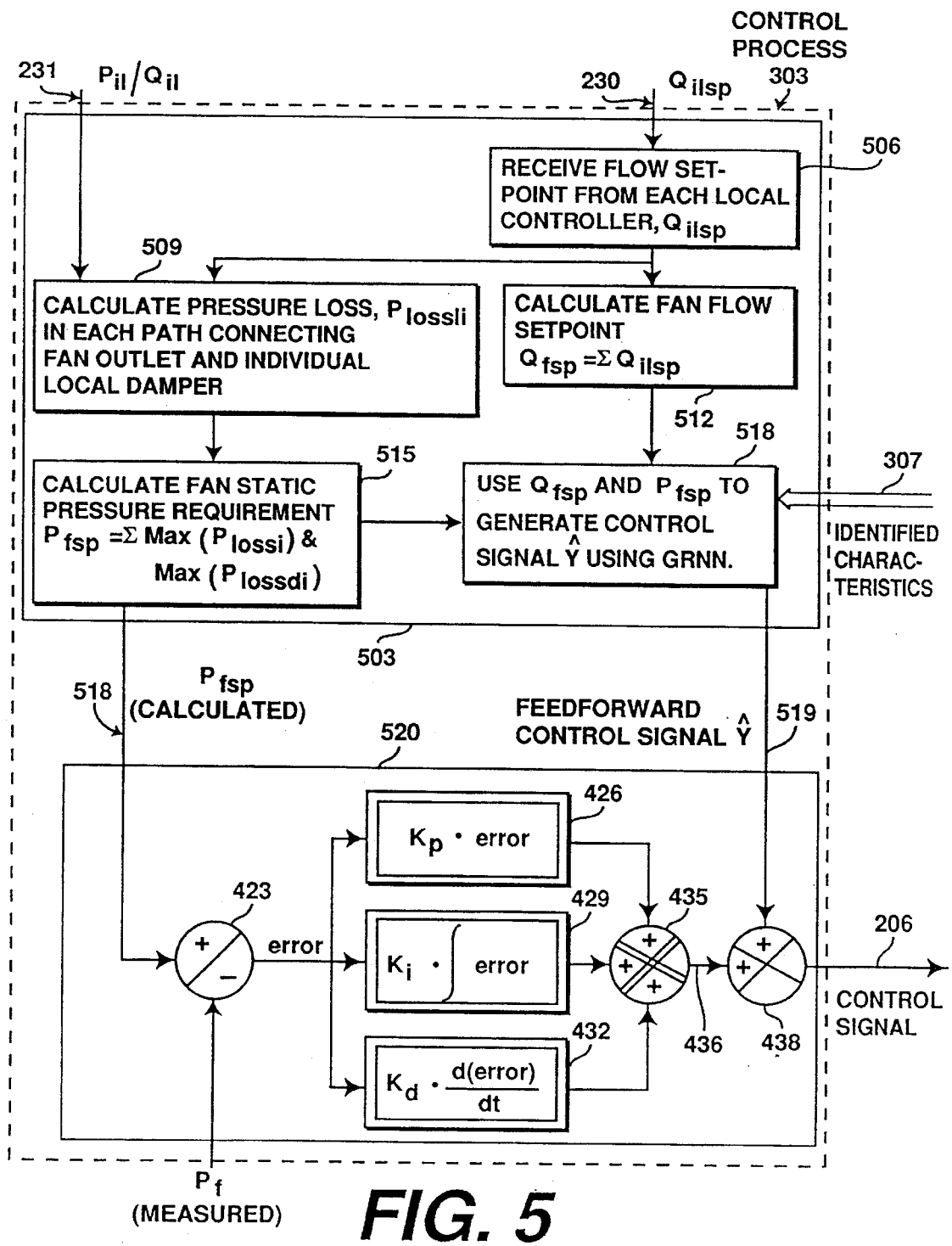
FIG. 5 generally depicts, in block diagram form, the control process of FIG. 3 implemented in a source controller for controlling a source component in accordance with the invention.

FIG. 5 generally depicts, in block diagram form, the control process 303 of FIG. 3 implemented in the source controller 236 for controlling a source component in accordance with the invention. The functionality of the feedback process 520 is essentially the same as the feedback process 420 of FIG. 4, thus like numerals between the feedback process 520 and the feedback process 420 depict like operations.

The feedforward process 503 begins at the block 506 where the flow setpoint $Q_{i1sp}$ 230 is received from each local controller implemented in the HVAC system 309. Again, FIG. 2 only depicts a single branch (branch 1) system, but the feedforward process 503 applies for any and all branches implemented within the HVAC system 309. Continuing, the flow setpoint $Q_{i1sp}$ received from the local controller 224 is sent to the block 509 where the pressure loss $P_{lossi}$ is calculated for each branch (only $P_{loss1}$ for branch 1 is calculated above).

The calculation in the block 509 utilizes the static pressure $P_{i1}$ and the flow $Q_{i1}$ of the damper 221 received via the line 231 to calculate the pressure loss $P_{loss1}$ as described in relation to the block 409 above. Once the branch pressure loss $P_{loss1}$ is calculated (as well as the pressure loss $P_{lossi}$ for all other branches), the calculated pressure loss values are input into the block 515 where the fan static pressure $P_{fsp}$ is calculated.

The fan static pressure $P_{fsp}$ is equal to the sum of the maximum pressure loss of all of the pressure losses $P_{lossi}$ received for each branch and the maximum pressure loss of all of the pressure losses $P_{lossdi}$ incurred by the dampers. The pressure loss $P_{lossdi}$ incurred by a damper is a portion of the pressure loss due to the second segment as shown in equation (4). Important to note is that the damper providing the maximum pressure loss $P_{lossdi}$ need not be associated with the branch having the maximum pressure loss $P_{lossi}$. As an example, a branch 2 (not shown) may contribute the maximum branch pressure loss ($P_{loss2}$ in that case), while the damper 221 of branch 1 may contribute the maximum pressure loss ($P_{lossd1}$ in that case). These two pressure losses would be added to yield the fan setpoint $P_{fsp}$. After being calculated, the fan setpoint $P_{fsp}$ is input into the feedback process 520 and represents the calculated fan setpoint $P_{fsp}$.

In parallel with the blocks 509 and 515, the fan flow setpoint $Q_{fsp}$ is calculated in the block 512 by summing all of the flow setpoints $Q_{isp}$ received in the block 506. The fan flow setpoint $Q_{fsp}$ exiting the block 512, together with the fan static pressure $P_{fsp}$ exiting the block 515, is input into the block 518. Also input into the block 518 is the identified characteristics of the fan 203 via the line 307. In the preferred embodiment, the identified characteristics of the fan 203 are stored values of a pressure setpoint ($P_{fsp}$) and a flow setpoint ($Q_{fsp}$) of air at the output of the fan 203, and a fan control signal ($Y'_f$).

The block 518 utilizes the calculated fan flow setpoint $Q_{fsp}$ exiting the 512 and the calculated fan static pressure $P_{fsp}$ exiting the block 515, together with the stored values of the pressure setpoint ($P_{fsp}$) and a flow setpoint ($Q_{fsp}$) of air at the output of the fan 203, and a fan control signal ($Y'_f$), to generate the feedforward control signal 519 as required for a fan flow setpoint $Q_{fsp}$ and a fan pressure setpoint $P_{fsp}$. Again, equation (8) of the GRNN model described above, is utilized where $\hat{Y}(X)$=the feedforward control signal $\hat{Y}$ as a function of X, $D_i^2=(X-X_i)^T(X-X_i)$, X=desired (forward) values of $P_{fsp}$ and $Q_{fsp}$, $X_i$=stored (past) values of $P_{fsp}$ and $Q_{fsp}$, Y'=stored (past) value $Y'_f$ of the control signal $\hat{Y}$, and σ=width for the same probability.

Insertion of these values into equation (8) yields the feedforward control signal $\hat{Y}$, which is output from the block 518 via the line 519.

In the preferred embodiment, the local controller 224 is a modified Terminal Equipment Controller (TEC) from the System 600 controller family manufactured by Landis & Gyr Powers. The TEC of the System 600 controller family is commercially available and is extensively documented. The User Reference Manual, Part No. 125-1940 for the TEC of the System 600 controller family is specifically incorporated herein by reference. Also in the preferred embodiment, the source controller 236 is a modified Modular Building Controller (MBC) from the System 600 controller family. The MBC of the System 600 controller family is commercially available and is extensively documented. The User Reference Manual, Part No. 125-1992 for the MBC of the System 600 controller family is specifically incorporated herein by reference. The modification required to implement the TEC and the MBC of the System 600 controller family is the addition of the identification process 306, the feedforward process 403 or 503 and the data exchange between the local controller 224 and the source controller 236, each of which has been described herein.

While various embodiments of the present inventions have been shown and described, it should be understood that various alternatives, substitutions and equivalents can be used. For example, in one alternate embodiment where adequate correlation between the calculated variables and the measured variables exist, the feedback processes 420 and 520 may be completely eliminated. In this embodiment, only the identification process 303 and the feedforward processes 403 or 503 are required to generate the control signal to control the desired component.

Various features of the present invention are set forth in the following claims.

I claim:

1. A method of controlling a component implemented in a heating, ventilation and air-conditioning (HVAC) distribution system, the method comprising the steps of:

identifying past characteristics of the component of the HVAC distribution system;

calculating desired characteristics of the component of the HVAC distribution system; and generating, based on the past and desired characteristics of the component, a control signal to control the component of the HVAC distribution system utilizing a general regression neural network.

2. The method of claim 1 wherein said step of identifying past characteristics further comprises storing the past characteristics in a look-up table.

3. The method of claim 2 wherein said step of identifying past characteristics further comprises identifying past characteristics based on values of measured system variables.

4. The method of claim 1 wherein said component further comprises one of the group of a fan, a pump, a damper, a fume hood, a supply box, or a general exhaust box.

5. A method of controlling a component implemented in a heating, ventilation and air-conditioning (HVAC) distribution system, the method comprising the steps of:

storing values of past characteristics in a look-up table;

generating, by a general regression neural network, an output signal based on certain values of the past characteristics stored in the look-up table;

controlling the component of the HVAC distribution system utilizing the output signal generated by the general regression neural network.

6. The method of claim 5 wherein said component further comprises one of the group of a fan, a pump, a damper, a fume hood, a supply box, or a general exhaust box.

7. An apparatus for controlling a component implemented in a heating, ventilation and air-conditioning (HVAC) distribution system, the apparatus comprising:

means for identifying past characteristics of the component of the HVAC distribution system;

means for calculating desired characteristics of the component of the HVAC distribution system; and means, based on the past and desired characteristics of the component, for generating a control signal to control the component of the HVAC distribution system utilizing a general regression neural network.

8. The apparatus of claim 7, wherein said means for identifying a control signal further comprises means for storing the values of the past characteristics in a look-up table for use by the general regression neural network.

\* \* \* \* \*

UNITED STATES PATENT AND TRADEMARK OFFICE
CERTIFICATE OF CORRECTION

PATENT NO. : 5,579,993
DATED : December 3, 1996
INVENTOR(S) : Ahmed et al.

It is certified that error appears in the above-indentified patent and that said Letters Patent is hereby corrected as shown below:

Column 3, line 10, after "drawings." delete "dr".

Column 7, line 8, delete "$P_{loss}$" and insert --$P_{loss1}$--.

Column 8, line 41, delete "$P_{loss}$" and insert --$P_{loss1}$--.

Column 9, line 15, after "an" delete "-".

Column 9, line 50, after "width" delete "o" and insert --$\sigma$--.

Signed and Sealed this

Twenty-sixth Day of August, 1997

Attest:

BRUCE LEHMAN

Attesting Officer

Commissioner of Patents and Trademarks